United States Patent
Batzler et al.

(10) Patent No.: US 8,653,692 B2
(45) Date of Patent: *Feb. 18, 2014

(54) DYNAMIC LOAD SHEDDING SYSTEM FOR A STANDBY GENERATOR

(71) Applicant: Briggs & Stratton Corporation, Wauwatosa, WI (US)

(72) Inventors: Brandon M. Batzler, Hartford, WI (US); Kenny J. Stair, North Prairie, WI (US); Sie Teong Lim, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,844

(22) Filed: Mar. 13, 2013

(65) Prior Publication Data

US 2013/0193757 A1 Aug. 1, 2013

Related U.S. Application Data

(63) Continuation of application No. 12/792,938, filed on Jun. 3, 2010, now Pat. No. 8,410,633.

(51) Int. Cl.
*H02J 3/14* (2006.01)

(52) U.S. Cl.
USPC .............. 307/39; 307/40; 307/41; 361/90; 363/95

(58) Field of Classification Search
USPC ................... 307/39–41; 361/90; 363/95
See application file for complete search history.

(56) References Cited

U.S. PATENT DOCUMENTS

| | | | |
|---|---|---|---|
| 5,644,173 A * | 7/1997 | Elliason et al. | 307/34 |
| 7,015,599 B2 | 3/2006 | Gull et al. | |
| 7,053,497 B2 | 5/2006 | Sodemann et al. | |
| 7,104,847 B2 | 9/2006 | Sodemann et al. | |
| 7,161,253 B2 | 1/2007 | Sodemann et al. | |
| 7,356,384 B2 | 4/2008 | Gull et al. | |
| 7,390,224 B2 | 6/2008 | Sodemann et al. | |
| 7,471,505 B2 | 12/2008 | Gull et al. | |
| 8,410,633 B2 * | 4/2013 | Batzler et al. | 307/41 |
| 2003/0178894 A1 * | 9/2003 | Ghent | 307/140 |
| 2004/0024483 A1 * | 2/2004 | Holcombe | 700/122 |
| 2006/0018069 A1 * | 1/2006 | Gull et al. | 361/90 |
| 2007/0222295 A1 * | 9/2007 | Wareham et al. | 307/32 |
| 2008/0172312 A1 * | 7/2008 | Synesiou et al. | 705/34 |

OTHER PUBLICATIONS

"100/200 Amp Automatic Transfer Switch", Installation & Operator's Manual, Briggs & Stratton, 2010, pp. 1-20.

* cited by examiner

*Primary Examiner* — Jared Fureman
*Assistant Examiner* — Alfonso Perez Borroto
(74) *Attorney, Agent, or Firm* — Andrus Intellectual Property Law

(57) ABSTRACT

A method and system for managing electrical loads on a standby generator. The method includes utilizing a transfer switch control to selectively shed loads each associated with one of a series of priority circuits. Priority values are initially assigned to each of the electric loads based upon the initial hard-wired connection of the electric loads to a main breaker panel during set up. The control unit of a transfer switch allows the user to reassign priority values to each of the electric loads based upon a user preference. The control unit includes one or more predefined priority assignment programs that can be selected to modify the priority values assigned to the electric loads.

17 Claims, 7 Drawing Sheets

DYNAMIC LOAD SHEDDING SYSTEM FOR A STANDBY GENERATOR

CROSS-REFERENCE TO RELATED APPLICATION

The present is a application is a continuation of U.S. patent application Ser. No. 12/792,938, filed on Jun. 3, 2010, priority to which is claimed and the subject matter of which is incorporated herein by reference.

BACKGROUND OF THE INVENTION

The present disclosure generally relates to a load shedding system. More specifically, the present disclosure relates to a load shedding system for selectively shedding the load applied to a standby generator.

When there is a power outage, backup power may be provided by a standby generator. In some cases, the standby generator is started automatically after detection of the power outage. A standby generator that is started automatically usually requires an automatic transfer switch to connect electrical loads to the generator rather than from the power supply. A combination of a standby generator and an automatic transfer switch is generally installed by trained personnel.

Since the power supply by the standby generator is limited by the size of the generator, the amperage rating of the generator can limit the types of and number of appliances that are connected to the standby generator during power outages. As an example, large appliances such as air conditioners, hot water heaters and on-demand appliances such as microwave ovens and toasters can draw a significant amount of power that in combination may exceed the rating limit for the standby generator.

Presently, automatic transfer switches are available that include a series of priority circuits that allow the automatic transfer switch to selectively reduce the load on the generator when the load approaches the rated limit for the generator. Typically, the priority circuits are assigned a value from 1 to a maximum number, such as 6 or 8, where the circuit assigned priority value 1 has the highest priority. When the load on the generator approaches the rating for the generator, the automatic transfer switch begins to shed load by opening switches or relays to disconnect the load connected to the lowest priority circuit. The automatic transfer switch continues to shed the loads from the lowest priority circuit to the highest priority circuit until the load reaches a preset limit to ensure that the generator can continue to provide power to the highest priority loads connected to the generator. When the load on the generator is reduced, load shedding ceases.

During initial installation of the standby generator and automatic transfer switch, installers connect dedicated loads to each of the priority circuits based upon a perceived importance of each of the loads. As an example, an air conditioner may be connected to priority circuit 1 where a less important load, such as a pool pump, may be connected to priority circuit 3. Thus, when the total load on the generator nears the rating for the generator, the pool pump connected to priority circuit 3 is shed before the air conditioner connected to priority circuit 1.

As described above, the priority circuits in currently available automatic transfer switches are hardwire connected at the time of installation. Therefore, if a user desires to change the device connected to priority circuit 1, the electrical wiring to the transfer switch must be adjusted.

SUMMARY OF THE INVENTION

The present disclosure relates to a load shedding system for managing the load applied to a standby generator. More specifically, the present disclosure relates to the operation of a control unit within a transfer switch to selectively shed load from a series of priority circuits to manage the amount of load applied to the standby generator during power interruption.

The system of the present disclosure includes a transfer switch positioned between a standby generator and a main breaker panel. When power is interrupted, the transfer switch activates the generator and disconnects the supply of electricity from the utility to the main breaker panel.

The transfer switch included in the system of the present disclosure includes a control unit that includes a plurality of control outputs. Each of the control outputs is connected to one of the electric loads. During initial installation, each of the electric loads is assigned an initial priority value within the control unit. Preferably, the control unit includes a user interface device that allows the user to identify which electric load is connected to each of the plurality of outputs.

When electric power is initially disrupted, the standby generator is activated and begins supplying power to each of the electric loads. The control unit of the transfer switch monitors the load on the generator and begins disconnecting electric loads from the generator when the combined load approaches the rating for the generator based upon the priority values initially assigned to each of the electric loads. The electric loads are disconnected in a sequential order from the lowest priority value to the highest priority value until the combined electric load on the generator falls below the rating for the generator.

Any time during the supply of power by the standby generator or at any other time, the user can selectively reassign the priority values to each of the electric loads to modify the order in which the electric loads are disconnected from the generator. In one embodiment, the transfer switch control unit includes a user interface that allows the user to either select one of a plurality of predefined priority assignment programs or assign priority values to each electric load individually. If the user selects one of the predefined priority assignment programs, the transfer switch control unit reassigns priority values to each of the electric loads. Once the priority values have been reassigned, the transfer switch control unit sheds load from the generator based upon the redefined priority sequence. In this manner, the user can adjust the priority values assigned to each electric load without having to rewire the transfer switch control unit.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
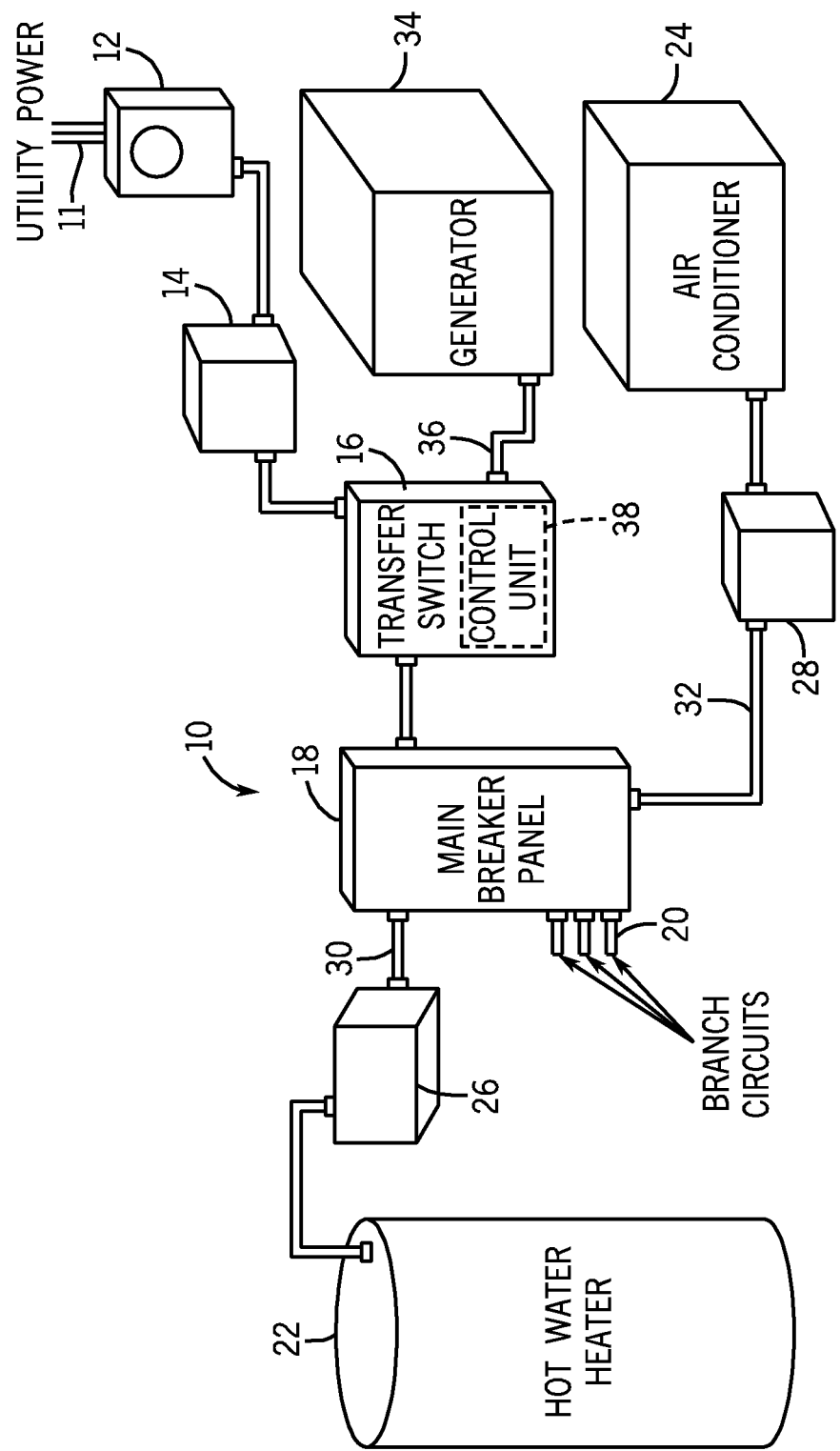
FIG. 1 is an electrical system having a load management system of the present disclosure.

FIG. 1 depicts a load management system 10. The load management system 10 includes a connection to a main power supply 11 through a meter 12. The power supply from the meter 12 is fed through an optional service disconnect switch 14 to a transfer switch 16. The transfer switch 16 carries out a series of functions, as will be described below and can also be referred to as a load-management controller. Throughout the following disclosure, the term "transfer switch" will be utilized with the understanding that the transfer switch 16 could also be referred to as a load-management device.

The transfer switch 16 feeds electrical power to a main breaker panel 18 for the residence. The main breaker panel 18 includes a series of individual branch circuits 20 to provide electrical power to normal loads included in a residence, such as the lights, power outlets, etc.

In addition to the branch circuits 20, several high power consumption loads, such as a hot water heater 22 and air conditioner 24, are connected to the main breaker panel 18 through separate interconnect devices, such as the remote contactors 26, 28. Each of the contactors 26, 28 is shown in FIG. 1 as receiving a signal along lines 30, 32 from the transfer switch 16. The high power consumption loads can be disconnected from the power supply through the contactors 26, 28, as will be described.

Although remote contactors 26, 28 are illustrated in FIG. 1 as controlling the supply of power to each of the high power consumption loads, it is contemplated that different types of interconnect device could be utilized. As one example, instead of utilizing the remote contactors 26, 28, the transfer switch 16 could include internal relays that can be selectively opened or closed to supply power to the high power consumption loads, such as the hot water heater 22 or the air conditioner 24. Throughout the remaining portions of the disclosure, remote contactors will be shown and described. However, it should be understood that different types of interconnect devices, such as internal relays within the transfer switch 16, could be utilized while operating within the scope of the present disclosure.

The transfer switch 16 is connected to a standby generator 34 through connection 36. As is well known, when the supply of power from the utility is interrupted, a control unit within the transfer switch 16 senses the interruption of power. The transfer switch 16 sends a signal to turn on the standby generator 34 and controls switches in the transfer switch 16 to direct the supply of electricity generated by the standby generator 34 to the main breaker panel 18. When the connection is made between the generator 34 and the main breaker panel 18, the connection between the utility power supply 11 and the main breaker panel 18 is disrupted such that electricity is supplied only by the standby generator 34.

Figure 2:
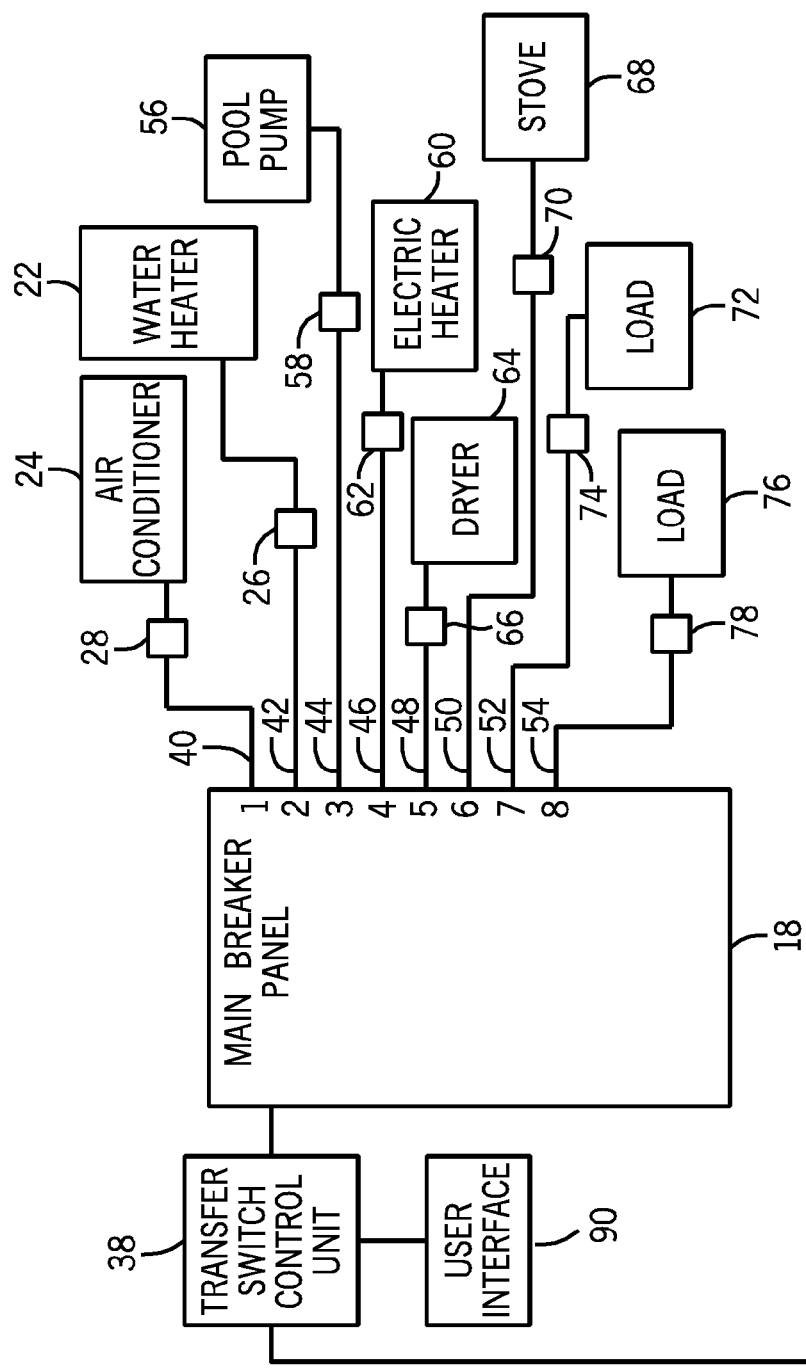
FIG. 2 is a schematic illustration of the priority circuits controlled by the transfer switch control board.

Referring now to FIG. 2, the main breaker panel 18 is connected to a transfer switch control unit 38. The control unit 38 can include any type of microcontroller that can be programmed to control the operation of various different functions of the transfer switch as is well known. In the embodiment shown in FIG. 2, only several of the connections to the main breaker panel 18 are illustrated. However, it should be understood that various other operative connections are included in the transfer switch and with the main breaker panel 18.

The control unit 38 controls the supply of power from the standby generator to a plurality of priority circuits through a series of control outputs on the main breaker panel 18, numbered 1-8 in FIG. 2. In the embodiment shown in FIGS. 1 and 2, the control unit 38 can send separate control outputs to the contactors 26, 28 shown in FIG. 1. The contactors 26, 28 each include a relay circuit that can be selectively opened or closed by the transfer switch control unit 38 to selectively allow power to be supplied to the hot water heater 22 or the air conditioner 24 shown in FIG. 1. As previously described, the remote contactors 26, 28 could be replaced by internal relays contained within the main breaker panel 18 and operated by the transfer switch control unit 38.

During the initial set up of the embodiment shown in FIG. 2, the air conditioner 24 is connected to the first control output 40 through the contactor 28. Water heater 22 is connected to the second control output 42 through the contactor 26. In the embodiment illustrated, pool pump 56 is connected to the third control output 44 through contactor 58. An electric baseboard heater 60 is connected to the fourth control output 46 through the contactor 62. A dryer 64 is connected to the fifth control output 48 through contactor 66. Stove 68 is connected to the sixth control output 50 through contactor 70. Load 72 is connected to the seventh control output 52 through the contactor 74. Finally, load 76 is connected to the eighth control output 54 through the contactor 78.

As illustrated in FIG. 2, the transfer switch control unit 38 controls eight control outputs (40-54) of the main breaker panel 18 such that a total of eight individual loads can be controlled by the transfer switch control unit 38 through the control outputs (40-54). Although eight individual control outputs are shown in the embodiment of FIG. 2, it should be understood that the transfer switch control unit 38 could be designed having fewer or more control outputs while operating within the scope of the present disclosure.

During the initial set up of the transfer switch, the user enters information into the transfer switch control unit 38 to indicate the type of load that is connected to each of the eight control outputs 40-54. In the embodiment shown in FIG. 2, a user interface device 90 is connected to the transfer switch control unit 38. The user interface device 90 preferably includes a display screen and some type of input device that allows the user to enter information into the control unit 38. As an example, when the system is set up as shown in FIG. 2, the user enters information into the control unit 38 to indicate that the air conditioner 24 is connected to control output 40, the water heater 22 is connected to the control output 42, the pool pump 56 is connected to the control output 44, and so on. Once this information is entered into the control unit 38 through the user interface device 90, the control unit 38 can maintain a database indicating the type of device connected to each of the eight control outputs 40-54. When the system is initially set up as shown in FIG. 2, the air conditioner 24 connected to the first control output 40 is initially assigned the highest priority value while the load 76 connected to the eighth control output 54 is initially assigned the lowest priority value.

When electrical power is interrupted, the standby generator 34 begins to operate and supplies electric power to the transfer switch. When electric power is being supplied from the standby generator, the transfer switch control unit 38 monitors the operation of the standby generator 34 to determine the amount of power being generated by the standby generator 34, which represents the total combined load seen by the generator, which includes not only the priority circuits but also all of the loads within the residence. When the transfer switch control unit 38 detects a combined current draw from all of the loads in the residence that approaches a first percentage amount of the rated load capacity for the standby generator 34, the transfer switch control unit begins to shed loads in a manner to be described. As an example, when the load reaches approximately 85% of the rating for the standby generator 34, the transfer switch control unit 38 begins to shed loads, as will be described.

During normal operating conditions of the standby generator, when the combined load calculated by the transfer switch control unit 38 approaches the rated percentage amount for the standby generator, the transfer switch control unit initially begins to shed load by first shedding the lowest priority load 76 connected to the eighth control output 54 through the contactor 78. Once load 76 has been shed, the transfer switch control unit again monitors for the current draw. If the current draw still exceeds the allowable threshold, the next lowest priority load 72 connected to the seventh control output 52 is shed. This process continues until enough load is shed to bring the combined load on the generator below the rated value for the generator. As can be understood in FIG. 2, during the initial set up, the highest priority load, which in the embodiment of FIG. 2 is air conditioner 24, is connected to the first control output 40. The second highest priority load, namely water heater 22, is connected to the second control output 44. Thus, when the load on the standby generator 34 exceeds the rated value, the transfer switch control unit 38 begins to sequentially shed loads from the eighth control output 54 to the first control output 40. Therefore, during initial installation of the transfer switch, the individual loads are connected to the transfer switch control unit in the priority sequence shown in FIG. 2.

As described above, any one of the loads can be shed by simply sending a signal from the transfer switch control unit 38 to the contactor associated with the load to cause a relay to open to interrupt power supply from the generator 34 to the individual load. Once the combined load on the generator 34 falls below the rated value, the relays contained in each of the contactors can be closed in a reverse priority order such that current from the generator is again supplied to the electric loads.

As an example, the preset maximum amount of load on the standby generator 34 is 85%, although other percentages can be used. When the total current draw drops far enough below the 85% preset maximum, additional loads can be added to the generator 34.

As discussed previously, during the initial set up of the transfer switch control unit 38 shown in FIG. 2, each of the electric loads are connected to one of the eight control outputs 40-54. During the initial set up, the electric load connected to the first control output 40 is assigned the highest priority value of 1 and the electric load 76 connected to the control output 54 is assigned the lowest priority value of 8. However, in accordance with the present disclosure, the transfer switch control unit 38 is able to reassign the priority values assigned to each of the control outputs 40-54, and thus the loads connected to the outputs, utilizing internal programming contained within the control unit 38.

During normal operation of the control unit 38, the control unit sheds each of the electric loads connected to the control outputs based upon the priority value assigned to the load. Although the loads may be assigned priority values based upon a perceived importance of the loads during normal conditions, the priority for each of the loads may change during a power outage or based upon the particular situation. As an example, during a power outage during a holiday family event, the home residents may desire to place a higher priority on the stove 68 rather than the air conditioner 24. In accordance with the present disclosure, the method and system allows the user to adjust the priority values assigned to each of the loads dynamically through the user interface device 90.

Figure 4A:
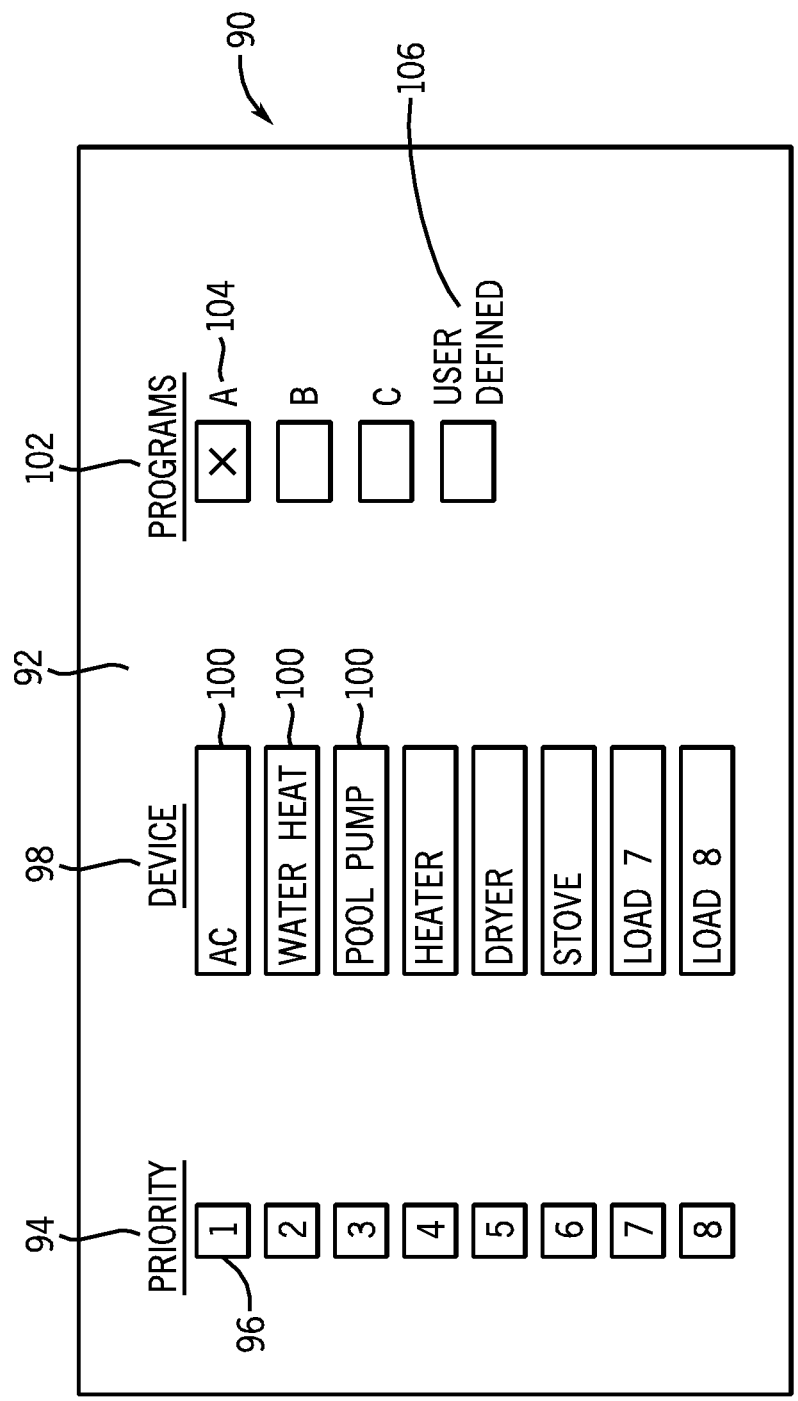
FIGS. 4a-4c are examples of a display screen on a user input device that allows the user to adjust the priority assignments.

Referring now to FIG. 4a, the user interface 90 is shown in one embodiment of the disclosure. Although the graphical user interface (GUI) shown on the display 92 in FIG. 4a is one contemplated embodiment, it should be understood that various different embodiments could be utilized while operating within the scope of the present disclosure.

The display 92 shown in FIG. 4a includes a priority label 94 above a column of priority values 96. As previously described, the main breaker panel 18 includes eight control outputs and thus includes eight priority values 96. The display 92 further includes a device heading 98 positioned above eight individual device labels 100. The device labels 100 can be changed by the control unit as desired.

The display 92 further includes a program heading 102. The program heading 102 is positioned above three separate programs 104 designated by labels A, B and C. In addition, the program heading 102 also includes a user defined setting 106.

In the embodiment shown in FIG. 4a, the user interface device 90 includes a touch-screen display that allows the user to enter input commands into the user interface device 90. The user interface device 90 could be positioned either near the transfer switch or, alternatively, remotely from the transfer switch, such as in a room within the residence. If the user interface device 90 is positioned remotely from the transfer switch, the user interface device 90 can communicate with the transfer switch either through a wired or wireless connection. Alternatively, it is contemplated that the user interface 90 could be shown on a home computer or other similar device in communication with the transfer switch.

Referring back to FIG. 4a, during initial set up, each of the electric loads is assigned an initial priority value based upon the control output to which the electric load is connected. The initial set up is referred to as the default setting and is indicated by program label A in FIG. 4a. The initial assignment of priority values to each of the control outputs, and thus the loads connected to the control outputs, is determined based on the physical connections to the transfer switch at the time the transfer switch is initially connected to the electric loads.

Figure 4B:
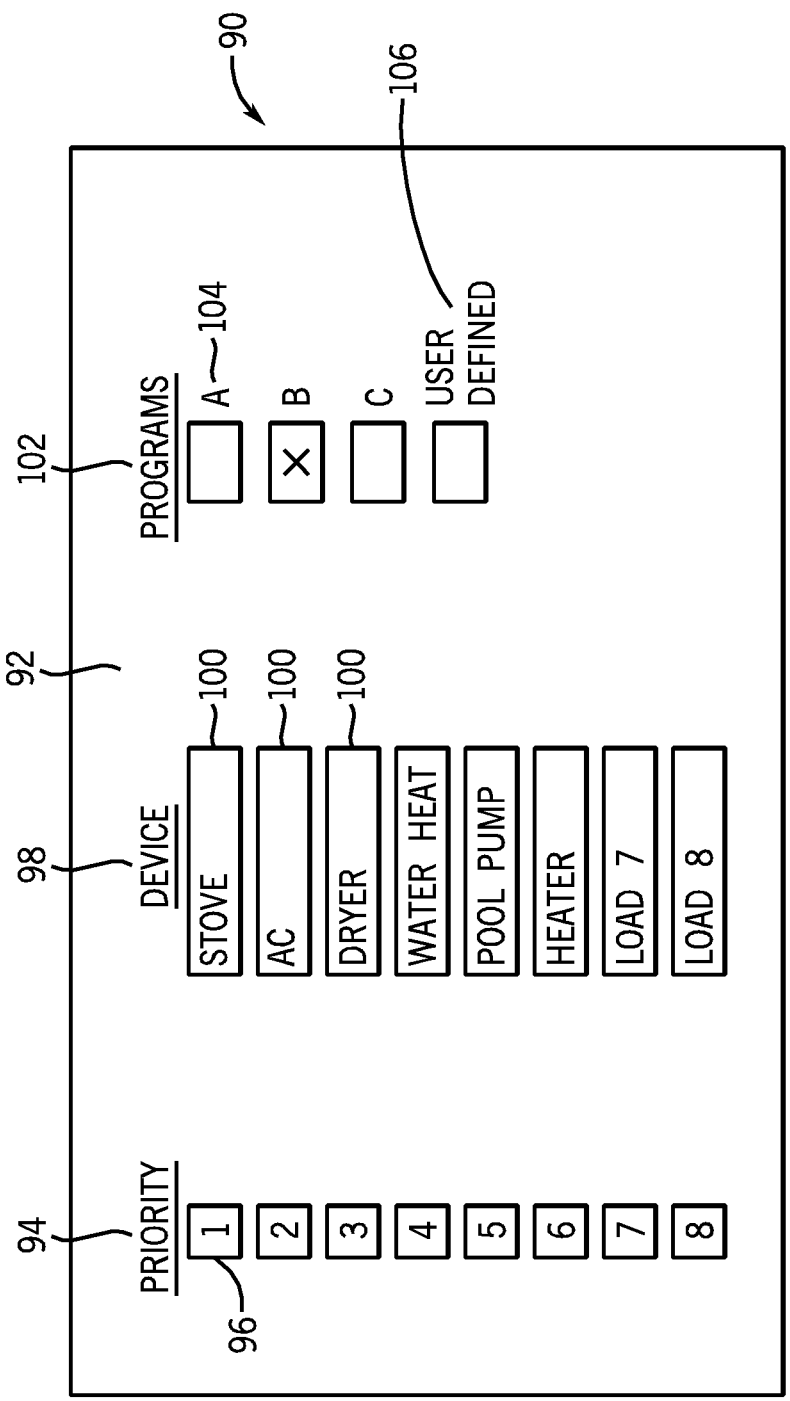

If the user desires to change the priority assignments, the user can select one of the two other predefined priority assignment programs indicated by reference characters B and C in FIG. 4a. As an illustrative example, the priority assignment program B can be defined such that the stove is assigned priority value 1, the air conditioner assigned priority value 2, the dryer assigned priority value 3 and so on as shown in FIG. 4b.

Figure 4C:
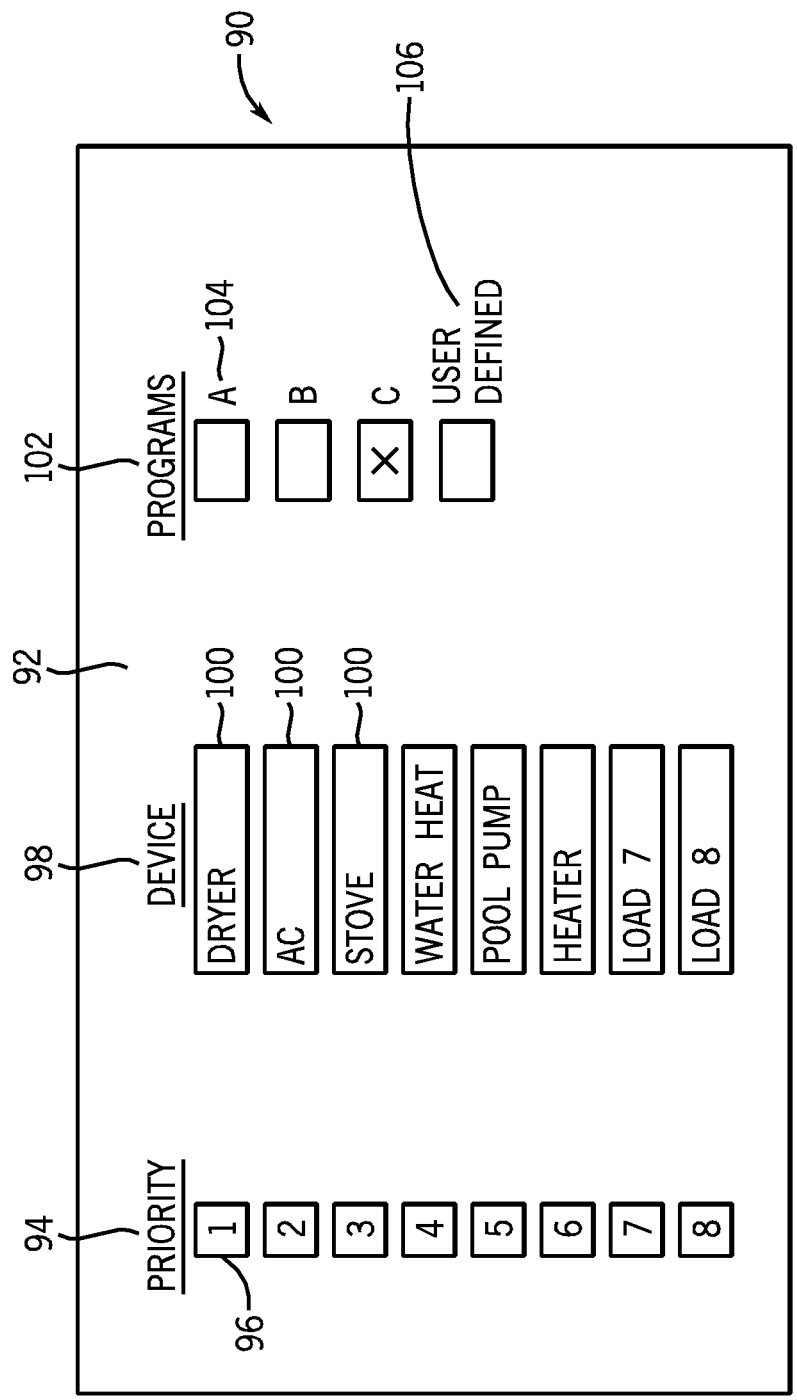

If the user selects the predefined priority assignment program C, the priority values are reassigned as shown in FIG. 4c. As an example, when program C is selected, the dryer is assigned priority value 1, the air conditioner is assigned priority value 2, the stove is assigned priority value 3 and so on, as illustrated in FIG. 4c. As can be understood in FIGS. 4a-4c, the priority values assigned to each of the electric loads can be modified by allowing the user to select one of the three predefined priority assignment programs A-C. Although three predefined priority assignment programs are shown, it should be understood that additional predefined priority assignment programs could be incorporated into the display while operating within the scope of the present disclosure.

In addition to the predefined priority assignment programs A-C shown in FIG. 4a, the display 92 also includes a user defined setting 106. When the user defined setting 106 is selected by the user, the user can individually assign priority values to each of the loads depending upon the currently perceived priority for each of the loads by the user. As an example, if a power outage occurs during a very cold day, the user may wish to select the baseboard heater 60 as the highest priority load and the air conditioner 24 as the lowest priority load. Alternatively, during a family function in which food is being cooked, the stove may be the highest priority load for the home occupant. By selecting the user defined setting 106, the home occupant can control which of the loads are shed first and which load is assigned the highest priority directly from the display 92.

As can be understood in FIG. 2, during the initial set up of the transfer switch control unit 38, the installer defines, in the control unit 38, which load is connected to which of the control outputs 40-54. Once the control unit 38 learns which load is connected to each control output, the control unit can simply reassign priority values to each of the loads through the connection to the transfer switch control unit 38 through the various outputs 40-54. As set forth previously, the control unit can shed load by simply opening or closing the interconnect devices positioned between the electric loads and the transfer switch control unit. In the embodiment shown, each load is connected to the control unit through a contactor, such as contactors 26 and 28. Alternatively, the connection between the loads could be carried out by a relay contained within the main breaker panel 18. In either case, the control unit 38 can selectively shed loads in any order defined by the user once the transfer switch control unit 38 has been programmed to define which of the loads is connected to which of the control outputs.

Figure 5:
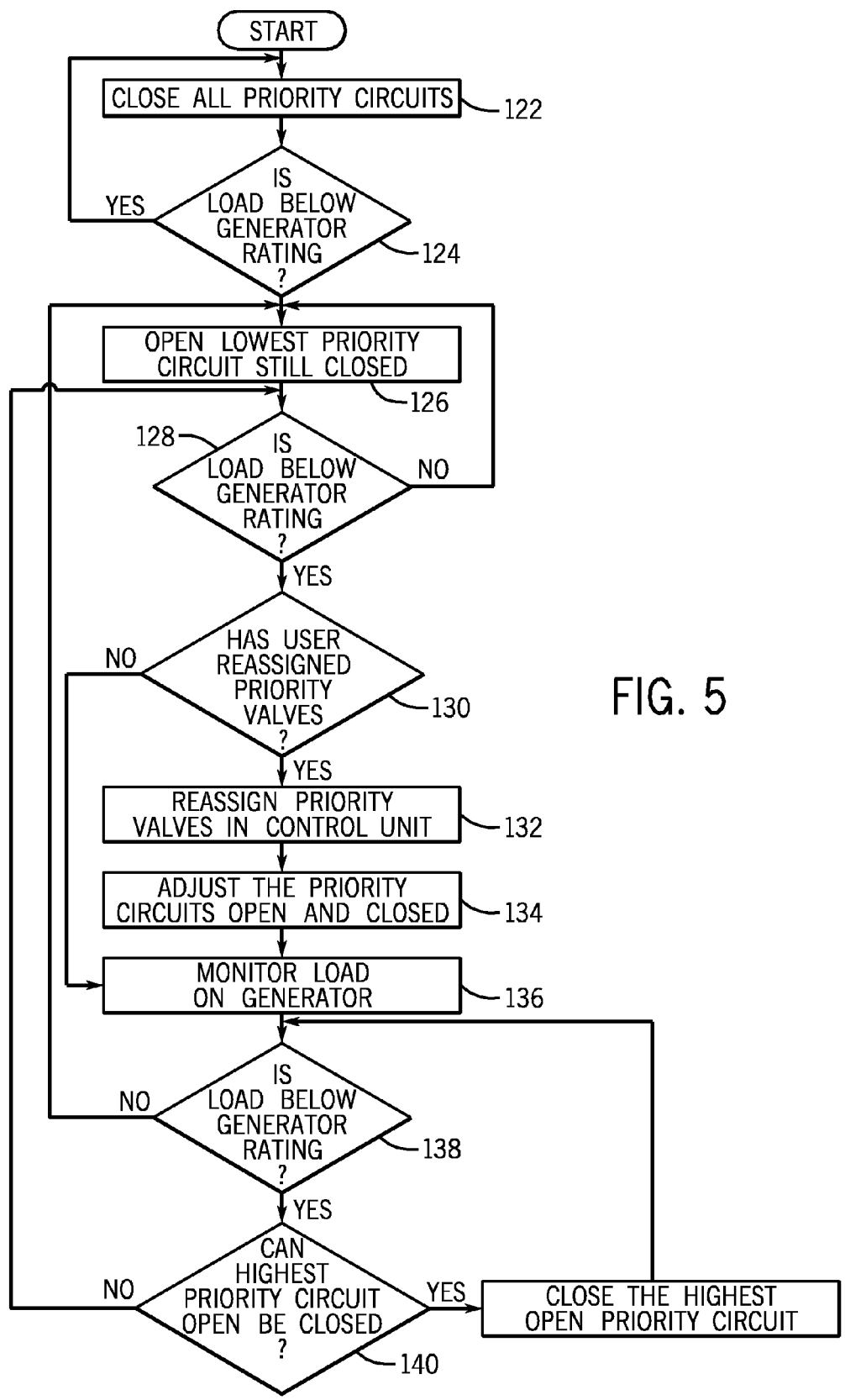
FIG. 5 is a flowchart illustrating one method of controlling the operation of the transfer switch to reassign priority values.

Referring now to FIG. 5, the operation of the control unit will now be described. Initially, when the control unit determines that electric power has been lost from the utility, the control unit sends a start signal to the generator, as illustrated in step 120. In addition to starting the generator, the control unit closes all of the priority circuits, as illustrated in step 122.

Upon power interruption and activation of the standby generator, the control unit determines in step 124 whether the total load for a combination of all the priority output circuits as well as the load distributed through the branch circuits 20 connected to the main breaker panel 18 in FIG. 1 is less than the generator rating. As indicated previously, the generator is typically operated at a percent of its maximum output, such as 85%.

If the current load on the generator is less than the rating, the transfer switch control unit continues to maintain all of the priority output circuits in a closed position such that power from the generator is supplied to each of the priority loads. However, if the system determines in step 124 that the combined load is no longer below the generator rating, the system begins to shed load by opening the relay associated with the lowest priority circuit still closed, as indicated in step 126. In the embodiment of FIG. 2, the system first opens the contactor 78 on the eighth control output 54, as indicated in step 126 of FIG. 4.

After the first load is shed in step 126, the system determines in step 128 whether the total load on the generator is now below the generator rating. If the total load is not below the generator rating, the system will return to step 126 and shed the next lowest priority load on the seventh control output 52. This sequence continues until the transfer switch control unit has opened the required number of priority circuits to decrease the load on the generator below the generator rating. As an example, the transfer switch control unit may need to open the relays associated with priority outputs 5-6 to bring the total load on the generator below the generator rating.

Once enough of the load has been shed, the system determine in step 130 whether the user has entered an input into the user interface device indicating that the user wishes to reassign the priority values for the loads. If the user has indicated such a desire to change the priority values, the system reassigns the priority values in the control unit, as shown in step 132. The reassignment of the priority values can be based upon either the selection of one of the predefined priority assignment programs A-C or based upon user controlled assignments of priority values to each of the loads individually.

Once the priority values have been reassigned in step 132, the system adjusts which of the priority circuits are opened and closed, as indicated in step 134. As an example, if the stove moved from priority value number 6 to priority value number 1, the system will cause the contactor 70 positioned between the stove 68 and the main breaker panel 18 to close, thus applying electric power to the stove 68. At the same time, the control unit 38 will close other contactors based upon the reassigned priority values. Once the priority circuits have been adjusted, the control system monitors the load on the generator in step 136 and again determines whether the load is below the generator rating in step 138. If the load is not below the generator rating, the system returns to step 126 and opens the lowest priority circuit still closed.

However, if the system determines in step 138 that the load is below the generator rating, the system determine whether the highest priority circuit that is open can be closed without exceeding the rating of the generator, as illustrated in step 140. This step ensures that the system provides power to the highest priority loads if and when the total load on the generator falls, such as when a device is turned off, such as is the case with the microwave oven. The system ensures that when the total overall load decreases, the system activates the highest priority loads that are disconnected first and only activates lower priority loads when the lower priority loads do not exceed the rating of the standby generator. In the manner described above, although various loads are initially connected to priority control outputs based upon their importance during the initial installation, the transfer switch control unit is capable of reassigning priority values to each of the loads without actually requiring the loads to be rewired to the transfer switch. In this manner, the system allows the user to selectively reassign priority values, either before or during a power outage.

Figure 3:
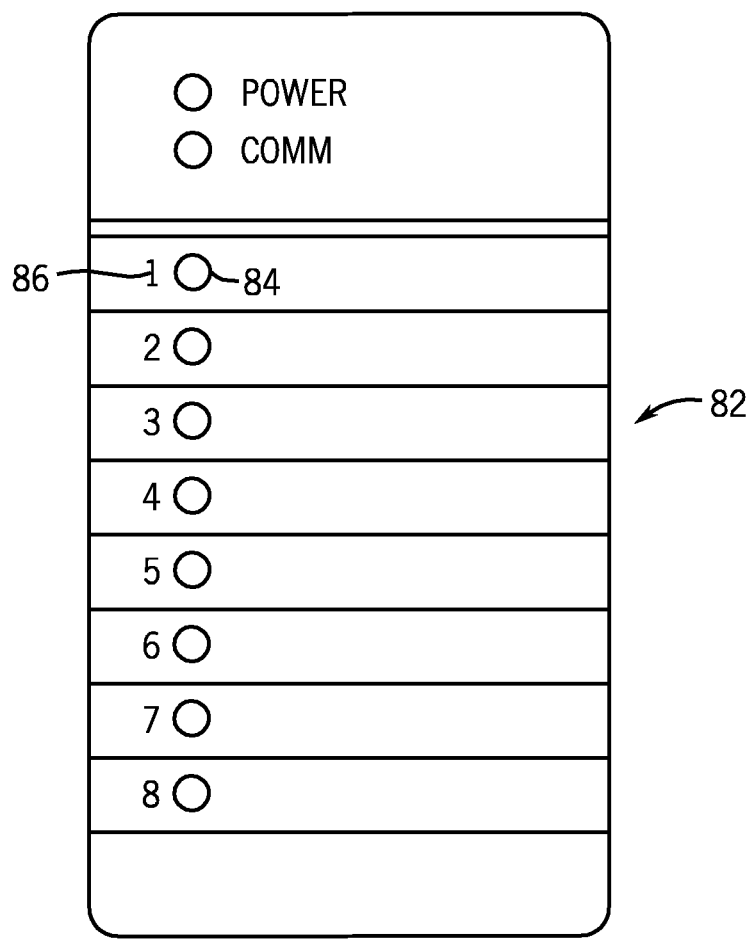
FIG. 3 is an illustration of the status display of the prioritized loads.

Referring to FIG. 3, the transfer switch 16 preferably includes a display 82 that has a plurality of individual indicator lights 84 positioned adjacent to a series of numeric indicators 86 representing each of the eight priority outputs. Each of the indicator lights 84 is illuminated when power is being supplied to the priority circuit associated with the indicator number 86.

We claim:

1. A method of managing a plurality of electric loads powered by a standby generator, the method comprising the steps of:
   interconnecting each of the plurality of electric loads to one of a plurality of outputs such that the electric loads receive power through the outputs;
   providing a plurality of predefined priority assignment programs in a control unit;
   assigning a priority value to each of the electric loads between a highest priority value and a lowest priority value for each of the priority assignment proams, wherein the initial priority values assigned to the electric loads vary among the plurality of priority assignment programs;
   selecting one of the predefined priority assignment programs;
   monitoring a combined load on the generator;
   disconnecting the electric loads from the generator in a sequential order from the lowest priority value to the highest priority value based on the assigned priority values according to the selected priority assignment program when the combined load on the generator reaches a rated value for the generator, wherein the electric loads having the lowest priority value are sequentially disconnected from the generator until the combined load on the generator falls below the rated value for the generator; and reassigning the priority values to the electric loads to modify the order the electric loads are disconnected from the generator upon the selection of another priority assignment program.

2. The method of claim 1 wherein the initial priority values for the electric loads are assigned based upon the physical connection of the electric loads to the plurality of outputs.

3. The method of claim 2 wherein the priority values are reassigned based upon user input.

4. The method of claim 1 wherein the priority assipment programs are presented on a user interface device such that the user can select one of the priority assignment programs through the user interface device.

5. The method of claim 1 further comprising the step of adjusting the loads connected to the generator based upon the reassigned priority values.

6. A method of managing a plurality of electric loads in a residence powered by a standby generator, the method comprising the steps of:

interconmcting each of the plurality of electric loads to one of a plurality of outputs;

providing a plurality of predefined priority assignment programs in a control unit;

assigning a priority value to each of the electric loads between a highest priority value and a lowest priority value for each of the priority assignment programs, wherein the initial priority values assigned to the electric loads vary among the plurality of priority assignment programs in a control unit:

selecting one of the predefined priority assignment programs;

monitoring a combined load on the generator in the control unit;

disconnecting the electric loads from the generator in a sequential order from the lowest priority value to the highest priority value based on the assigned priority values according to the selected priority assignment program when the combined load on the generator reaches a rated value for the generator, wherein the electric loads having the lowest priority value are sequentially disconnected from the generator until the combined load on the generator falls below the rated value for the generator; and reassigning priority values to the electric loads to modify the order the electric loads are disconnected from the generator upon the selection of another priority assignment program.

7. The method of claim 6 wherein the initial priority values for the electric loads are assigned based upon the physical connection of the electric loads to the plurality of outputs.

8. The method of claim 7 wherein the priority values are reassigned based upon user input.

9. The method of claim 8 wherein the user input is received from a user interface device.

10. The method of claim 6 wherein the priority assignment programs are presented on a user interface device such that the user can select one of the priority assignment programs through the user interface device.

11. The method of claim 6 further comprising the step of adjusting the loads connected to the generator based upon the reassigned priority values.

12. The method of claim 6 wherein each of the electric loads are connected to an interconnect device, wherein the control unit selectively connects and disconnects each of the electric loads through the interconnect devices.

13. The method of claim 12 wherein the interconnect devices are each contained within a main breaker panel.

14. The method of claim 12 wherein the interconnect devices are positioned external to a main breaker panel.

15. A load management system for managing one or more electric loads in a residence powered by a standby generator, the system comprising:

a transfer switch coupled to the standby generator;

a control unit contained within the transfer switch and operable to selectively connect and disconnect each of the electric loads from the generator, the control unit being configured to:

provide a plurality of predefined priority assignment programs;

assign an initial priority value to each of the electric loads between a highest priority value and a lowest priority value for each of the priority assignment programs;

select one of the predefined priority assignment programs;

monitor a combined load on the generator;

disconnect the electric loads from the generator in a sequential order based on the priority values assigned to each load as assigned by the selected priority assignment program, wherein the loads having the lowest priority value are sequentially disconnected until the combined load on the generator falls below a rated value for the generator;

reassign priority values to the electric loads based upon the selection of another priority assignment program; and adjust the loads connected to the generator based upon the reassigned priority values. from the another selected priority assignment program.

16. The load management system of claim 15 further comprising a user interface device coupled to the control unit of the transfer switch, wherein the user selects the priority assignment programs through the user interface device.

17. The load management system of claim 16 further comprising a plurality of interconnect devices each positioned between one of the electric loads and the transfer switch, wherein each interconnect device is operable to selectively connect and disconnect the electric load from the generator based upon a signal from the control unit.

* * * * *